United States Patent [19]

Beccarini et al.

[11] Patent Number: 5,677,044
[45] Date of Patent: Oct. 14, 1997

[54] MULTILAYER THERMOSHRINKABLE FILMS

[75] Inventors: Enrico Beccarini; Gianni Perdomi, both of Ferrara; Claudio Cometto, Bologna, all of Italy

[73] Assignee: Montell Technology Company BV, Hoofddorp, Netherlands

[21] Appl. No.: 634,405

[22] Filed: Apr. 18, 1996

[30] Foreign Application Priority Data

Dec. 18, 1995 [IT] Italy .................. MI95A2653

[51] Int. Cl.$^6$ ........................... B32B 7/02
[52] U.S. Cl. ............ 428/218; 428/516; 428/523; 428/213
[58] Field of Search ................. 428/516, 523, 428/218, 213

[56] References Cited

U.S. PATENT DOCUMENTS

| | | | |
|---|---|---|---|
| 4,188,350 | 2/1980 | Vicik et al. | 428/516 |
| 4,439,478 | 3/1984 | Ferguson et al. | 428/516 |
| 4,820,557 | 4/1989 | Warren | 428/516 |
| 4,837,084 | 6/1989 | Warren | 428/516 |
| 4,948,657 | 8/1990 | Ogawa et al. | 428/516 |
| 5,298,302 | 3/1994 | Boice | 428/516 |
| 5,326,627 | 7/1994 | Yazaki et al. | 428/516 |
| 5,434,010 | 7/1995 | Smith et al. | 428/516 |
| 5,455,303 | 10/1995 | Panagopoulos, Jr. et al. | 525/95 |
| 5,472,791 | 12/1995 | Landoni | 428/516 |
| 5,482,771 | 1/1996 | Shah | 428/516 |
| 5,543,223 | 8/1996 | Shah | 428/516 |

FOREIGN PATENT DOCUMENTS

| | | |
|---|---|---|
| WO 93/03078 | 2/1993 | WIPO . |
| WO 95/20009 | 7/1995 | WIPO . |

*Primary Examiner*—Mark D. Sweet
*Attorney, Agent, or Firm*—Bryan Cave LLP

[57] ABSTRACT

Multi-layer heat-shrinkable films in which at least one layer (A) is based on a polyolefin composition comprising a propylene copolymer and having particular crystallinity characteristics, and at least one layer (B) comprises a linear compolymer of ethylene with one or more $\alpha$-olefins (LLDPE). The films are characterized by an optimum balance of physicomechanical properties, processability and sealability at low temperatures.

12 Claims, No Drawings

MULTILAYER THERMOSHRINKABLE FILMS

This invention relates to multi-layer heat-shrinkable films in which at least one layer comprises a linear copolymer of ethylene with α-olefins having 3–12 carbon atoms (LLDPE) and at least one layer comprises a copolymer of propylene having particular crystallinity characteristics.

Multi-layer heat-shrinkable films in which at least one layer comprises LLDPE are known in the art. The said films are usually prepared by a co-extrusion process in which LLDPE is fed to the central extruder and polymer mixtures suitable for giving the film workability are fed to the lateral extruders. Depending on the technology used, a flat or tubular primary film is obtained which is then oriented in a biaxial direction by the known tenter frame or twin bubble methods. Multi-layer heat-shrinkable films usually consist of a middle layer essentially made up of an LLDPE modified with 1-octene and 2 outer layers which are intended to prevent the film sticking together during working and to improve the processability of the film. It is known in fact that certain aspects of the production of heat-shrinkable films based on LLDPE are critical because the temperature at which the orientation process takes place is close to the temperature at which the polymer melts. There may thus be problems such as tearing of the film and instability of the bubble when the film is produced by the twin bubble method.

Examples of heat-shrinkable multi-layer films are given in U.S. Pat. No. 4,532,189. This patent describes films with 3 or 5 layers in which the middle layer is made up of linear low- or medium-density ethylene copolymers (LLDPE or LMDPE). Ethylene/propylene copolymers (EPC), ethylene/vinyl-acetate copolymers (EVA) or low-density polyethylene (LDPE) can be added to the middle layer. The outer layers are made up of EPC, with the possible addition of homopolymeric propylene (PP), LLDPE or LMDPE. Any intermediate layers are made up of EVA or mixtures of LLDPE or LMDPE with ionomeric resins. According to what is reported in the said patent, the film has good physicomechanical characteristics.

Patent application EP-A-586160 describes a heat-shrinkable multi-layer film with 3 or 5 layers in which the middle layer is made up of LLDPE. The outer layers may be made up of blends of EPC with polybutene (PB), or else blends of PP or EPC with a propylene/butene copolymer (PBC), or of PBC. The patent application reports that the film has good lap seal strength characteristics.

Patent application EP-A-595252 describes 3-layer heat-shrinkable films in which the middle layer is made up of LLDPE to which additives such as hydrogenated hydrocarbon resins, polyethylene or polypropylene waxes, VLDPE, etc., are added. The addition of these additives is claimed to give improved physicomechanical characteristics and improved lap seal strength to the films. The outer layers are made up of PP or EPC, also with the addition of the compounds mentioned above.

The films of the known art present various problems, however, depending on the composition of the various layers. If the outside layer is made up of PP and/or EPC, for example, the film can only be heat-sealed at relatively high temperature. In addition, the working range within which the orientation process can be carried out, i.e. the temperature range within which the film can be oriented without there being problems of the film itself tearing or instability of the bubble, is restricted and shifted towards relatively high temperatures. The use of PBC in the outer layers is claimed to reduce the sealability temperature but—especially when the copolymer contains large amounts of butene—has the disadvantage of increasing the percentage of polymer extractable in xylene to levels which are not acceptable for applications of the film in the food sector. In all cases, the use of polyethylene-based layers coupled with polypropylene-based layers can cause problems of delamination of the resultant film, because of the poor compatibility between the various layers.

It has now been found that it is possible to prepare multi-layer heat-shrinkable films in which at least one layer comprises LLDPE and at least one layer comprises particular propylene copolymers, the said films having an optimum balance of physicomechanical properties, processability and sealability at low temperatures. It has in fact been seen that by using polyolefin compositions comprising a copolymer of propylene with ethylene and/or with one or more α-olefins having 4–12 carbon atoms, the said compositions having particular values for crystallinity (expressed as the percentage of material melted at a certain temperature), melting point and xylene-insoluble fraction, it is possible to produce multi-layer films over a wider and lower temperature range than when use is made of homopolymeric propylene and/or ethylene-propylene copolymers, for example. The film which is obtained is characterized by good compatibility between the layers, low sealability temperatures and good heat shrinkage properties. In certain cases it is possible to produce multi-layer films in which the layer comprising LLDPE is based on an ethylene/1-butene copolymer; this is particularly surprising since it is known that until now it was in practice only possible to use ethylene/1-octene copolymers, in view of the well-known processability problems which are encountered when use is made of LLDPEs modified with 1-hexene or 1-butene.

The object of this invention is therefore a multi-layer heat-shrinkable film in which: at least one layer (A) comprises a polyolefin composition (i) comprising a copolymer (A1) of propylene with ethylene and/or one or more $CH_2=CHR^1$ α-olefins, where $R^1$ is a hydrocarbon radical having 2–10 carbon atoms, containing more than 70% by weight of propylene, the said polyolefin composition (i) having a xylene-insoluble fraction greater than 85%, a maximum melting peak at temperatures above 130° C. and a crystallinity content such that at 90° C. the percentage of material melted is greater than 10%; and at least one layer (B) comprises a linear copolymer (B1) of ethylene with one or more $CH_2=CHR$ α-olefins, where R is a hydrocarbon radical having 1–10 carbon atoms, the said copolymer containing up to 20 mol % of $CH_2=CHR$ α-olefins and having a density between 0.88 and 0.945 g/cm$^3$.

The maximum melting peak and the crystallinity content at a given temperature are determined by differential scanning calorimetry (DSC), using the method described later.

Composition (i) preferably has a crystallinity such that at 90° C. the percentage of material melted is greater than 15%; more preferably the crystallinity is such that at 100° C. the percentage of material melted is greater than 20% and at 110+ C. the percentage of material melted is greater than 30%.

Polyolefin composition (i) comprises a copolymer (A1) of propylene with ethylene and/or one or more $CH_2=CHR^1$ α-olefins, the said copolymer generally containing more than 70% by weight of units derived from propylene, in particular containing 80–94% by weight of units derived from propylene, 1–5% by weight of units derived from ethylene and 5–15% by weight of units derived from the $CH_2=CHR^1$ α-olefin.

In a preferred embodiment of the invention, polymer composition (i), in addition to the copolymer (A1), also comprises a copolymer (A2) of propylene with ethylene, preferably containing 1–5% by weight of units derived from ethylene. In this case, composition (i) preferably comprises 40–80 parts by weight of the said copolymer (A1) and 20–60 parts by weight of the said copolymer (A2).

Compositions of this type can be produced by mixing both components in the molten state, for example in a mixer having a high homogenizing power or, alternatively, directly in an extruder.

Composition (i) comprising the two components (A1) and (A2) described above is preferably produced directly by synthesis using a sequential polymerization process consisting of at least two stages, where, in any order, ethylene and propylene are polymerized in one stage, obtaining a copolymer (A2) containing 1–5% by weight of units derived from ethylene, and ethylene, propylene and a $CH_2=CHR^1$ α-olefin are polymerized in another stage, obtaining a copolymer (A1) containing 80–94% by weight of units derived from propylene, 1–5% by weight of units derived from ethylene and 5–15% by weight of units derived from the $CH_2=CHR^1$ α-olefin.

The $CH_2=CHR^1$ α-olefin is generally chosen from 1-butene, 1-pentene, 1-hexene, 4-methyl-1-pentene and 1-octene, and is preferably 1-butene.

The copolymer (B1) of layer (B) is preferably a copolymer of ethylene with a $CH_2=CHR$ α-olefin chosen from propylene, 1-butene, 1-pentene, 1-hexene, 4-methyl-1-pentene and 1-octene.

The Melt Index (determined by the ASTM D-1238 method, condition E) of the said copolymer (B1) has values which are preferably between 0.2 and 5 g/10 minutes, more preferably between 0.2 and 3 g/10 minutes.

In a preferred embodiment of the invention the polymer material of layer (B) is made up essentially of a polymer composition (ii) comprising from 80 to 100 parts by weight of the said copolymer of ethylene (B1) and from 5 to 30 parts by weight of a copolymer (B2) of propylene with ethylene and/or one or more $CH_2=CHR^1$ α-olefins, where $R^1$ is a hydrocarbon radical having from 2 to 10 carbon atoms, the said copolymer (B2) containing from 60 to 98% by weight of units derived from propylene, and having a xylene-insoluble fraction greater than 70%. In polymer composition (ii) the copolymer (B2) preferably contains from 70 to 95% by weight of units derived from propylene, from 5 to 30% by weight of units derived from the $CH_2=CHR^1$ α-olefin; the said copolymer (B2) preferably has a xylene-insoluble fraction greater than 80%. Particular preference is given to polymer compositions (ii) in which the copolymer (B2) contains from 80 to 98% by weight of units derived from propylene, from 1 to 10% by weight of units derived from ethylene and from 1 to 10% by weight of units derived from the $CH_2=CHR^1$ α-olefin, which is preferably 1-butene, the said copolymer (B2) having a xylene-insoluble fraction greater than 80%. Olefin compositions (ii) comprising the components (B1) and (B2) as previously described can be produced by mixing both components in the molten state, for example in a mixer with a high homogenizing power or, alternatively, directly in an extruder. The said compositions (ii) are preferably produced by a sequential polymerization process comprising several stages, as described in the patent applications WO 95/20009 and WO 93/03078.

The films of the invention can be conveniently produced using methods known in the art, such as the tenter frame method or the twin-bubble method. In the latter case, the method involves the production of a primary tubular film with concentric layers by extrusion of the polymer components constituting the various layers through an annular slot. The primary film is calibrated and rapidly cooled and then heated (by IR or hot air) and oriented in a longitudinal and transverse direction by blowing with compressed air (transverse orientation) and increasing the speed of the take-up roll (longitudinal orientation). The bioriented film is then rapidly cooled to stabilize the molecular orientation of the film.

The films of this invention preferably have a structure with three layers ABA, in which layers (A) and (B) have the compositions described earlier. The various layers can be present in variable amounts relative to the total weight of the film. Each of the two outer layers is preferably present in amounts that generally range from about 5 to about 45% of the total weight of the film. More preferably, each of the outer layers is present in amounts between 10 and 30%. The two outer layers are preferably present in equal parts. The said films are characterized by a good set of physico-mechanical properties, in particular optimum tear resistance, and by improved processability compared with films of the prior art having a similar structure. The film can in fact be easily oriented, without problems due to bubble instability, in a temperature range which is wider and lower than the conventionally used temperatures. The orientation at low temperature also has the advantage of improving the mechanical and optical properties of the film. The films of this invention are also characterized by a lower initial sealability temperature (S.I.T.) than similar structures in which the outer layers are made up of PP and/or EPC.

In the said films with the structure ABA the outer layers A are preferably obtained from polymer compositions (i) comprising the components (A1) and (A2) as previously described, while the inner layer (B) is obtained from compositions (ii) comprising the components (B1) and (B2) as previously described. Surprisingly it has been seen that in this case it is possible to obtain films with good properties even when component (B1) is an ethylene/1-butene copolymer; it is known in fact that until now the said ethylene/1-butene copolymers have not been generally used as essential components of heat-shrinkable films, because of the well-known processability problems. Films of this type are characterized in particular by good compatibility between the layers, as a result of which film delamination problems are reduced.

The weight ranges described relate to the weight ratios of the various components (A1), (A2), (B1) and (B2). As is known to experts in the field, and as can be easily determined by routine tests, it is obviously possible to add further polymer components (f.i. EVA, LDPE, HDPE, etc.), additives (such as adhesion enhancers, stabilizers, antioxidants, anticorrosives, processing aids, etc.) and both organic and inorganic substances which can give specific properties to the films of the invention.

The heat-shrinkable films of this invention have broad applications in the packaging sector, particularly the packaging of small objects, foods, etc.

The following examples are given as illustrations and do not restrict the invention.

EXAMPLES

The properties indicated were determined by the following methods:

Composition of polymers: percentage by weight of the various monomers determined by I.R.;

Xylene-insoluble fraction: 2 g of polymer are dissolved in 250 cm$^3$ of xylene at 135° C., with stirring. After 20 minutes the solution is left to cool, while still stirring, until the temperature reaches 25° C. After 30 minutes the precipitated insoluble polymer is separated by filtration. The solvent is removed from the solution by evaporation in a stream of nitrogen and the residue is dried under vacuum at 80° C. to constant weight. In this way the percentage of polymer soluble in xylene at 25° C. is calculated and the percentage of polymer that is insoluble is thus determined;

Enthalpy of melting, melting point and % of material melted: ASTM D 3418–82;
Density: ASTM D 1505;
Melt Index E (MIE): ASTM D 1238, condition E;
Melt Index F (MIF): ASTM D 1238, condition F;
Melt Index L (MIL): ASTM D 1238, condition L;
F/E: ratio between Melt Index F and Melt Index E;
Elmendorf Tear Strength: ASTM D 1922, determined both in the machine direction (MD) and in the transverse direction (TD);
Tear resistance: ASTM D 1004;
Breaking elongation: ASTM D 882;
Breaking load: ASTM D 882;
Dart test: ASTM D 1709/A;
Coefficient of friction (C.O.F.): ASTM D 1894.

Production of the film: general procedure

Multi-layer films with the structure ABA were produced by the twin-bubble method with the following steps:

feeding of compositions (i) [layers (B)] and (ii) [layer (A)] to the relevant extruders and extrusion of the three-layer tubular film with head temperatures between 195 and 215° C.;
cooling of the primary tubular film to temperatures around 25° C.;
heating of the primary film in an oven with IR rays or with hot air;
biorientation with a 5/5 longitudinal/transverse stretch ratio;
cooling of the bioriented tubular film to temperatures around 25° C.

Example 1

A three-layer film was produced using for layers (A) a polyolefin composition (i) comprising a propylene/1-butene/ ethylene terpolymer (A1) containing 86.8% by weight of units derived from propylene, 10% by weight of units derived from 1-butene and 3.2% by weight of units derived from ethylene. Composition (i) had a maximum melting peak at 137° C. and a crystallinity such that at 90° C. the percentage of material melted was 16.5%, at 100° C. it was 25.5% and at 110° C. it was 36.8%; the xylene-insoluble fraction of composition (i) was greater than 94.5%. For the middle layer (B) use was made of a polymer composition (ii) comprising 85% of an ethylene/1-butene copolymer [component (B1)] and 15% of a terpolymer of propylene (about 92%) with ethylene (about 2.5%) and 1-butene (about 5.5%) having a xylene-insoluble fraction greater than 70% [component (B2)]. The resultant composition had an MIE of 0.6 and a density of 0.910.

Operating as described in the general methodology for production of the film, a film 19 μm thick was obtained in which the contribution of each outer layer was about 15% and the middle layer about 70%; the characteristics of the film are shown in Table 1.

Example 2

A three-layer film was produced by operating as in Example 1 but using a polymer composition (ii) having an MIE of 1.0 and a density of 0.910.

Operating as described in the general methodology for production of the film, a film 19 μm thick was obtained in which the contribution of each outer layer was about 15% and the middle layer about 70%; the characteristics of the film are shown in Table 1.

Example 3

A three-layer film was produced by operating as in Example 1 but using a polymer composition (ii) having an MIE of 1.0 and a density of 0.914.

Operating as described in the general methodology for production of the film, a film 19 μm thick was obtained in which the contribution of each outer layer was about 15% and the middle layer about 70%; the characteristics of the film are shown in Table 1.

Example 4

A three-layer film was produced by operating as in Example 1 but using for layer (B) a commercial ethylene/ 1-octene copolymner (Clearflex FG308 marketed by Enichem) with an MIE of 1.0 and a density of 0.925.

Operating as described in the general methodology for production of the film, a film 19 μm thick was obtained in which the contribution of each outer layer was about 15% and the middle layer about 70%; the characteristics of the film are shown in Table 1.

TABLE 1

|  |  | EX. 1 | EX. 2 | EX. 3 | EX. 4 |
| --- | --- | --- | --- | --- | --- |
| Dart Test | (g) | 249 | 400 | 340 | 419 |
| Tear Resistance MD | (N) | 1.3 | 1.7 | 1.9 | 1.7 |
| Tear Resistance TD | (N) | 1.3 | 1.6 | 1.8 | 1.7 |
| Elmendorf MD | (N) | 0.10 | 0.09 | 0.11 | 0.10 |
| Elmendorf TD | (N) | 0.10 | 0.10 | 0.13 | 0.11 |
| Breaking elongation MD | (%) | 84 | 77 | 71 | 81 |
| Breaking load MD | (MPa) | 61.5 | 53.1 | 73.1 | 80.3 |
| Breaking elongation TD | (%) | 64 | 56 | 63 | 62 |
| Breaking load TD | (MPa) | 59 | 45.3 | 69.9 | 90.4 |
| C.O.F. |  | 0.13 | 0.07 | 0.09 | 0.14 |

We claim:

1. Multi-layer heat-shrinkable films comprising: at least one layer (A) comprising a polyolefin composition (i) comprising a copolymer (A1) of propylene with ethylene and one or more $CH_2=CHR^1$ α-olefins, where $R^1$ is a hydrocarbon radical having 2–10 carbon atoms, containing more than 70% by weight of propylene, said polyolefin composition (i) having a xylene-insoluble fraction greater than 85%, a maximum melting peak at temperatures above 130° C. and a crystallinity such that at 90° C. the percentage of material melted is greater than 15%; and at least one layer (B) comprising a polyolefin composition (ii) comprising (a) from 80 to 100 parts by weight of a linear copolymer of ethylene (B1) with one or more $CH_2=CHR$ α-olefins, where R is a hydrocarbon radical having 1–10 carbon atoms, said linear copolymer of ethylene containing up to 20 mol % of $CH_2=CHR$ α-olefin and having a density between 0.88 and 0.945 g/cm$^3$, and (b) from 5 to 30 parts by weight of a copolymer of propylene (B2) with ethylene and/or one or more $CH_2=CHR^2$ α-olefins, where $R^2$ is a hydrocarbon radical having from 2 to 10 carbon atoms, said copolymer (B2) containing from 60 to 98% by weight of units derived from propylene and having a xylene-insoluble fraction greater than 70%.

2. Films according to claim 1 in which composition (i) has a crystallinity such that at 90° C. the percentage of material melted is higher than 15%.

3. Films according to claim 2 in which said copolymer (A1) contains 1–5% by weight of units derived from ethylene, 5–15% by weight of units derived from said $CH_2=CHR^1$ α-olefin and 80–94% by weight of units derived from propylene, said composition (i) having a xylene-insoluble fraction greater than 85%.

4. Films according to claim 3 in which said composition (i) comprises 40–80 parts by weight of said copolymer (A1) and 20–60 parts by weight of a copolymer (A2) of propylene with ethylene, containing 1–5% by weight of units derived from ethylene, said composition (i) having a xylene-insoluble fraction greater than 90%.

5. Films according to claim 4 in which the $CH_2=CHR^1$ α-olefin is chosen from 1-butene, 1-pentene, 1-hexene, 4-methyl-1-pentene and 1-octene.

6. Films according to claim 1 in which the $CH_2=CHR$ α-olefin is chosen from propylene, 1-butene, 1-pentene, 1-hexene, 4-methyl-1-pentene and 1-octene.

7. Films according to claim 1 in which said copolymer (B2) contains from 70 to 95% by weight of units derived from propylene and from 5 to 30% by weight of units derived from the $CH_2=CHR^2$ α-olefin, said copolymer (B2) having a xylene-insoluble fraction greater than 80%.

8. Films according to claim 1 in which the copolymer (B2) contains from 80 to 98% by weight of units derived from propylene, from 1 to 10% by weight of units derived from ethylene and from 1 to 10% by weight of units derived from the $CH_2=CHR^2$ α-olefin, said copolymer (B2) having a xylene-insoluble fraction greater than 80%.

9. Films according to claim 1 in which the polymer composition (i) comprises 40–80 parts by weight of the (A1) copolymer and 20–60 parts by weight of an (A2) copolymer of propylene with ethylene, the (A2) copolymer containing 1–5% by weight of units derived from ethylene.

10. Films according to claim 1 wherein the polyolefin composition (i) has a crystallinity such that at 100° C. the percentage of material melted is higher than 20%.

11. Films according to claim 1 wherein the polyolefin composition (i) has a crystallinity such that at 110° C., the percentage of material melted is higher than 30%.

12. Films according to claim 4, having a three-layer structure, wherein the inner layer is layer (B), and layer (B) is surrounded by two outer layers, the two outer layers each being within the scope of layer (A).

* * * * *